Jan. 7, 1941.                J. LYMAN ET AL                2,227,598
                         RADIO ABSOLUTE ALTIMETER
                           Filed July 3, 1937          2 Sheets-Sheet 1

INVENTORS
JOSEPH LYMAN,
FRANCIS L. MOSELEY
PAUL B. HUNTER

BY
Herbert H. Thompson
THEIR ATTORNEY.

Jan. 7, 1941. J. LYMAN ET AL 2,227,598
RADIO ABSOLUTE ALTIMETER
Filed July 3, 1937 2 Sheets-Sheet 2

INVENTORS
JOSEPH LYMAN,
FRANCIS L. MOSELEY and
PAUL B. HUNTER
BY Herbert H. Thompson
THEIR ATTORNEY Patented Jan. 7, 1941

2,227,598

UNITED STATES PATENT OFFICE 2,227,598

RADIO ABSOLUTE ALTIMETER

Joseph Lyman, Huntington, and Francis L. Moseley, Pelham, N. Y., and Paul B. Hunter, Bloomfield, N. J., assignors to Sperry Gyroscope Company, Inc., Brooklyn, N. Y., a corporation of New York Application July 3, 1937, Serial No. 151,778

11 Claims. (Cl. 250—1)

This invention relates, generally, to radio means for measuring distance, and the invention has reference, more particularly, to a novel radio absolute altimeter for accurately indicating the height of an aircraft above the terrain over which the same is flying.

Owing to the inherent inaccuracies of the ordinary barometric type of altimeter, such as those due to lag of the instrument and to natural variations in atmospheric pressure from hour to hour and from place to place, attempts have been made to develop an absolute radio altimeter, such as those employing standing radio waves produced by reflection from the ground when radio frequency energy is radiated from the craft, and noting as the craft rises or descends the number of loops or nodes the craft passes through. This type of altimeter has not proved satisfactory owing to the difficulty involved in accurately counting the nodes or loops and to errors resulting from failure of the indicating instrument to show all nodes or loops and to the tendency of the same to inaccurately indicate as the result of stray signals.

Other radio altimeters employ carrier waves modulated by low frequency oscillations supplied from a suitable source, the resultant energy being sent out from the craft and, after reflection, being demodulated for comparison in phase with the output of the low frequency source. This type of altimeter is generally complicated and requires considerable equipment to be carried on the craft.

The principal object of the present invention is to provide a novel radio absolute altimeter that serves to give a continuous, visual, accurate indication of the height above the earth of the craft employing the same regardless of atmospheric conditions or visibility, the said altimeter being of rugged, simple and of compact nature especially adapting the same for use on aircraft, although the same is adapted for other uses, such as in ship navigation for determining the distances of obstructions, etc.

Another object of the present invention lies in the provision of a novel altimeter of the above character that employs an intermittently operated ultra high frequency radio transmitter for transmitting electromagnetic waves that are directed from the craft toward the earth or toward any other object, the distance of which from the craft is desired, said waves upon reflection being received by a suitable radio receiver, means being provided and operable at the instant of propagation of said waves to cause a cathode ray tube to operate by movement of the beam over the face thereof to time the interval elapsing between the time of transmission and the time of reception of the reflected wave, the extent of movement of the cathode ray beam over the tube face during such interval being a measure of the desired distance, the tube face being calibrated to directly indicate such distance.

Other objects and advantages will become apparent from the specification, taken in connection with the accompanying drawings wherein the invention is embodied in concrete form.

In the drawings.

Similar characters of reference are used in all of the above figures to indicate corresponding parts.

Figure 1:
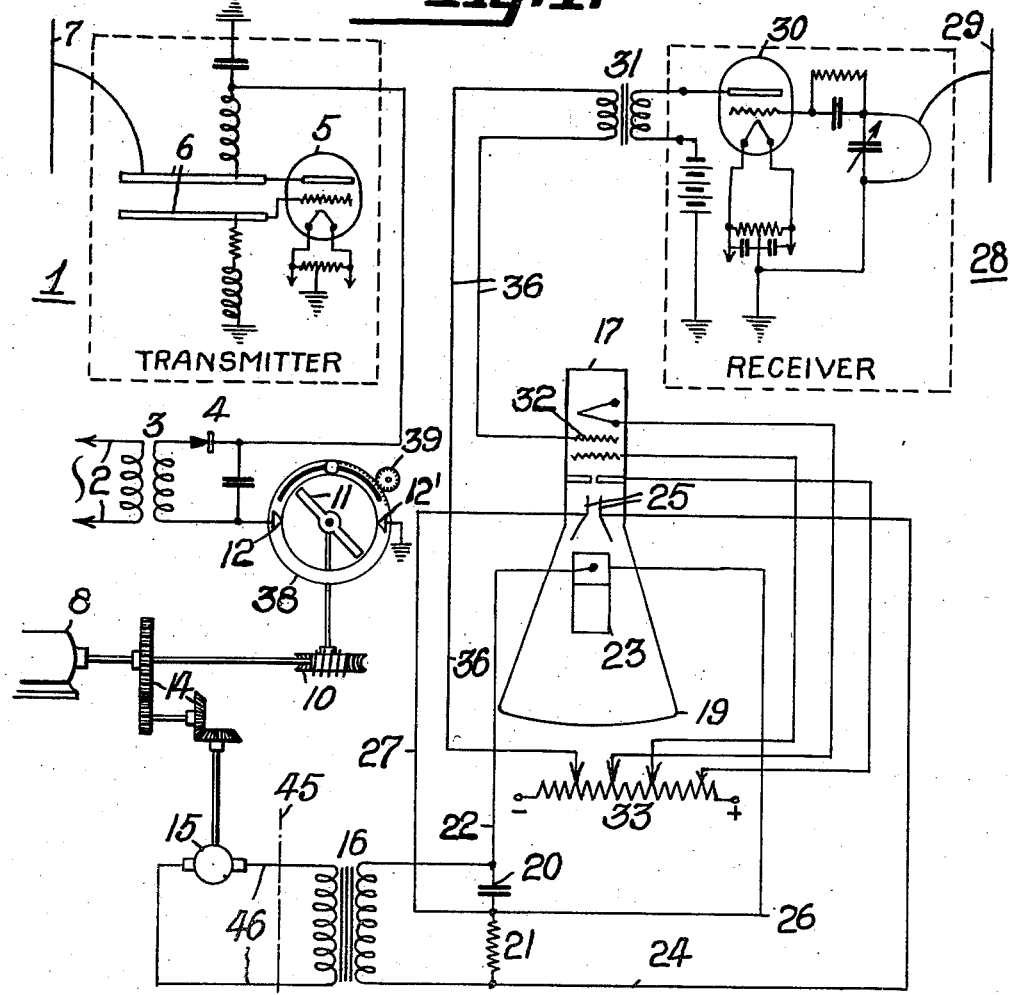
Fig. 1 is a wiring diagram illustrating one form of the novel altimeter of this invention.
Figure 3:
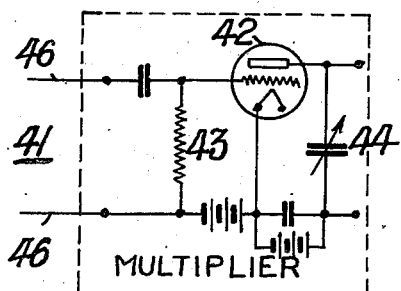
Fig. 3 is a diagram of a frequency multiplier that may be used in connection with the structure of Fig. 1.
Figure 2:
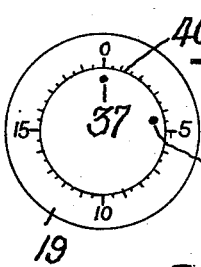
Fig. 2 is a face view of the cathode ray tube of Fig. 1.

Referring now to Figs. 1 to 3, the reference numeral 1 designates a radio transmitter that is illustrated as of the ultra high frequency type since the electromagnetic waves produced thereby easily penetrate fog and are not appreciably interfered with by uncontrollable natural phenomena such as radiation from the sun, and can be detected directionally with comparative ease. U. H. F. waves of approximately 600 megacycles are preferably used, although waves of from 60 to 600 mc./sec. may be used satisfactorily. The transmitter 1 is supplied through leads 2 from a suitable A. C. source, such as a generator, a step-up transformer 3 being employed in conjunction with a rectifier 4 for supplying the transmission line controlled oscillator including oscillator tube 5 and transmission line 6. The antenna 7 is of the directive type and preferably is directed downwardly toward the earth, but the same may be adjustable, if desired, adapting the same to be pointed in any direction as when it is desired to measure the distance to obstructions, such as a mountain, a building, etc.

A motor 8 operates through reduction gearing 10 to rotate a bridging bar 11 that serves to intermittently bridge contacts 12, 12' in the transmitter supply circuit, thereby completing this circuit at regular intervals of preferably from 25 to 50 times per second, to cause the transmitter 1 to send out U. H. F. waves momentarily at said intervals. Motor 8 also operates through step-up gearing 14 to drive a generator 15, the output of which is supplied through a phasing transformer 16 to a phase splitting circuit connected for causing the beam of a cathode ray tube 17, should such beam be on, to traverse a circle on the face 19 of the tube. The phase splitting circuit comprises a condenser 20 and resistance 21 connected in series across the secondary of transformer 16, one side of the transformer secondary being connected by lead 22 to one of the tube vertical deflecting plates 23 and the other side of this secondary being connected by lead 24 to one of the tube horizontal deflecting plates 25, the other vertical deflecting plate being connected by lead 26 to the common point of condenser 20 and resistance 21, while the other horizontal deflecting plate is similarly connected by lead 27 to such common point.

The radio receiver 28 has a directive antenna 29 positioned for receiving waves reflected from the earth or other object toward which the transmitter antenna 7 is directed. The output of the detector tube 30 is supplied through transformer 31 to the control grid 32 of cathode ray tube 17. Potentials for the cathode, anode and grids of tube 17 are supplied from a potentiometer 33 having its ends connected to a source of D. C. supply. Tube 17 is normally biased off due to a suitable negative bias supplied from potentiometer 33 through lead 36 and the secondary of transformer 31 to the control grid 32.

In use, the motor 8 by alternately closing and opening the circuit of transmitter 1 through rotation of bridging bar 11, causes this transmitter to send out U. H. F. waves at regularly recurring intervals of, for example, twenty-five times a second. Also, the sweep generator 15, acting through phasing transformer 16 and the phase splitting circuit, causes changing potentials to be applied to the pairs of deflecting plates 23, 25 that would cause the beam to trace a circle on the face 19, were the beam turned on.

Each time a wave or waves leave the transmitter 1, a certain small portion of these waves will be transmitted directly to receiver antenna 29 so that a voltage pulse is produced immediately in the output circuit of tube 30, thereby momentarily raising the potential on control grid 32 and turning tube 17 on so that a luminous spot 37 appears on the face or screen of tube 19. The ring 38 carrying contacts 12, 12' is manually adjustable angularly through gearing 39 so that this spot 37 may be made to coincide with the zero mark of the altitude scale 40 on face 19. The waves directed toward the earth strike the same and are reflected upwardly and are received by receiver antenna 29, thereby producing a pulse in the output of transformer 31 and again turning tube 17 on momentarily so that another spot 37' is caused to appear on the face 19 of the tube at a point on scale 40 corresponding to the height of the craft above the earth. This will be evident when it is noted that the imaginary cathode ray beam is sweeping a circle over face 19 at a definite speed, determined by the speed of motor 8 and the ratio of gearing 14, so that during the interval it takes the electromagnetic waves to reach the earth and reflect back to the receiver 29, the imaginary cathode ray beam travels a definite distance along its circular path which is proportional to the height of the craft, so that the position of the second spot 37' corresponds to the height of the craft.

By suitable shielding inserted between the transmitter and receiver, the brightness of spot 37 may be made the same as that of spot 37' or, if desired, spot 37 may be eliminated altogether. Since the spots 37 and 37' appear on screen 19 approximately twenty-five times a second, persistence of vision on the part of the observer makes these spots appear continuous, the spot 37' moving along scale 40 as the craft ascends or descends.

The extent of movement of the spot 37' for a given change in altitude may be readily varied not only by changing the ratio of gearing 14, but also by use of a frequency multiplier 41 shown in Fig. 3. This device consists of a thermionic tube 42 connected to serve as a harmonic generator through use of grid leak 43 and tuning condenser 44. This device is adapted to be inserted at the point indicated by the broken line 45 of Fig. 1 in the leads 46. By adjusting condenser 44, the primary of transformer 16 may be tuned to the resonance frequency of the desired harmonic, thereby multiplying the rate of sweep of the imaginary cathode ray beam by the order of the harmonic and correspondingly changing the altitude scale 40. Thus, the successive indications on this scale may be caused to indicate, for example, ten, one hundred, or one thousand foot intervals, whichever is desired. Thus, when landing or taking off, the pilot will know accurately his exact height above ground.

Figure 4:
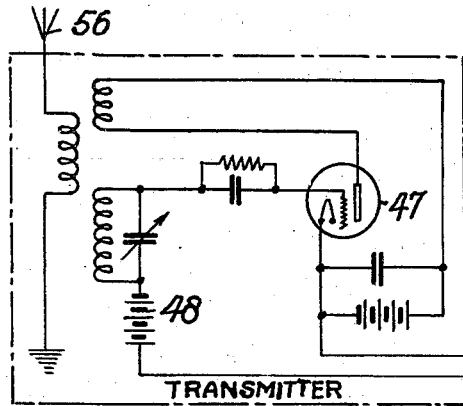
Fig. 4 is a wiring diagram illustrating a somewhat different form of the invention.
Figure 5:
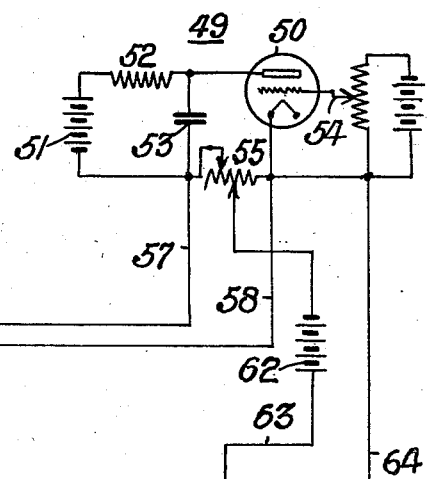
Fig. 5 is a face view of the cathode ray tube of Fig. 4.
Figure 5:
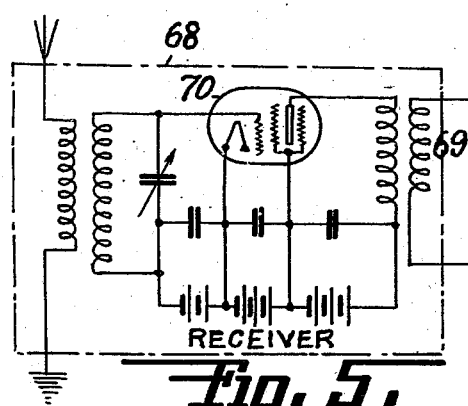
Figure 6:
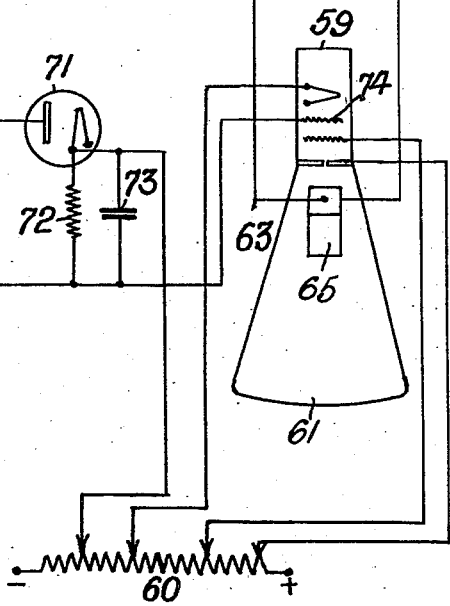
Fig. 6 is a graph illustrating an operating characteristic of the form of invention shown in Figs. 4 and 5.
Figure 6:
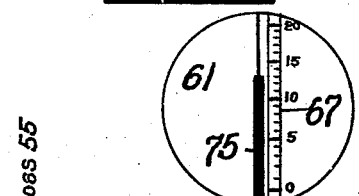
Figure 6:
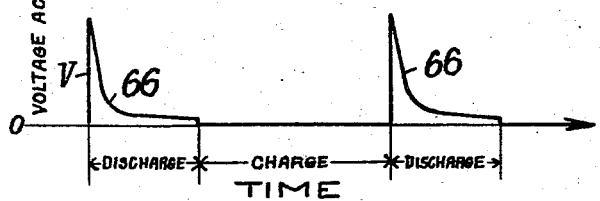

In the form of the invention shown in Figs. 4 to 6, the transmitter 46 normally has its oscillator tube 47 biased off by the battery 48 and this tube is put on momentarily at regular intervals, such as twenty-five times a second, due to the action of the relaxation generator 49. This generator comprises a grid controlled rectifier tube 50 whose plate is supplied from battery 51 through a resistance 52. A condenser 53 is connected at one side to the plate supply of tube 50 at a point between the plate electrode of the tube and resistor 52, and is connected at its other side to the tube cathode. The minimum plate voltage at which tube 50 will discharge may be varied by varying the grid bias as determined by the adjustment of grid potentiometer arm 54 and, if desired, by supplying sufficient grid bias the tube may be prevented from passing current.

Assuming that the grid has control, the condenser 53 will be charged by current supplied from battery 51 through resistor 52. While condenser 53 is charging, the plate voltage applied to tube 50 is steadily raised until it reaches a critical value, whereupon the grid loses control and condenser 53 is suddenly discharged through tube 50 and a resistor 55 included between the tube cathode and condenser 53. Due to the approximate short circuiting effect of the tube discharge on the condenser 53, the potential of this condenser, and hence that of the tube plate, drops below that necessary to sustain the discharge and before the condenser can recharge, due to the presence of resistor 52, with the result that tube 50 shuts off and its grid again regains control preparatory to the repetition of the cycle, which is repeated preferably approximately 25 or 30 times a second.

When the tube 50 discharges condenser 53, a relatively substantial voltage is suddenly applied across the resistor 55, as shown by vertical line V in Fig. 6. Since the ends of this resistor are connected in the cathode-grid circuit of oscillator tube 47 by leads 57, 58, this voltage is applied to the grid of the tube and, overcoming the bias of battery 48, causes this tube to function momentarily to thereby cause transmitter 46 to send off U. H. F. electromagnetic waves from its directional transmitter antenna 56 which may be directed toward the ground or other object whose distance is desired.

Cathode ray tube 59, whose elements are supplied from potentiometer 60 conected across a D. C. supply, is normally biased on with its cathode ray beam held elevated preferably above the visible part of face 61 by a battery 62 connected through leads 63, 64 and a portion of resistor 55 to the vertical deflecting plates 65 of tube 59. As soon as the voltage V appears across resistor 55, the polarity of the deflecting plates is reversed and the beam is moved instantly to the bottom of face 61 and thereupon starts to rise at a rate depending upon the rate of decay of the voltage across resistor 55, and this may be varied by varying the magnitude of this resistor. Curves 66 show typical rates of decay of voltage V during the period of discharge of condenser 53. Thus, as the voltage V decays, the cathode ray beam is caused to move upwardly due to battery 62 and produces luminous path 75 on face 61 adjacent the altitude scale 67. The beam moves upwardly rapidly at first and with gradually decreasing rapidity so that scale 67 must be provided with its length indications arranged substantially logarithmically and with the greater spacing of indications at the bottom of the scale so as to permit a more accurate determination of altitude for points near the earth.

As soon as the radio receiver 68 receives the reflected wave sent out by transmitter 56, a voltage pulse is impressed on the secondary of output transformer 69 from detector tube 70, causing diode 71 to operate to create a voltage drop across resistor 72, charging condenser 73 and depressing the voltage on control grid 74 so that the cathode ray beam is cut off, the length of the fluorescent line 75 indicating on scale 67 the height of the craft. By the time condenser 73 has discharged and the cathode ray beam turned on, the same will be directed to its initial or normal position above the scale 67, preparatory to another operation of the relaxation generator 49. Since the path or line 75 is produced twenty-five or more times per second, persistence of vision on the part of the observer will cause this path or line to appear continuous.

By varying the magnitude of resistor 55, the rate of upward movement of the cathode ray beam may be varied, thereby varying the altitude scale 67 so that the successive indications thereof may be caused to indicate, for example, ten, one hundred, or one thousand foot intervals, whichever is desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio altimeter for aircraft, an ultra high frequency transmitter having a control circuit, motor driven contact means in said control circuit for causing said transmitter to operate intermittently, a cathode ray tube having deflecting plates and a grid, means connected for synchronous operation with said motor driven contact means and connected to said deflecting plates for causing the beam of said tube to describe a definite path should the same be turned on, and a radio receiver connected to said tube grid for turning said tube beam on momentarily when the direct radiation from said transmitter reaches said receiver and also when reflected radiation initially transmitted from said transmitter reaches said receiver, thereby producing spots on the face of said tube, the spacing of which is a measure of the height of the aircraft.

2. In a radio altimeter for aircraft, an ultra high frequency transmitter, a supply circuit therefor, a motor, contact means driven from said motor for intermittently connecting said transmitter to its supply circuit for effecing intermittent operation of said transmitter, a receiver, a cathode ray tube having deflecting plates and a control grid, said grid being connected to said receiver so as to be turned on momentarily when energy pulses are received by said receiver, and generator means driven from said motor and connected to said tube deflecting plates for changing the location of the beam of said tube during the interval between direct radiation pulses and reflected radiation pulses for giving a measure of the height of the aircraft.

3. A radio altimeter as claimed in claim 2, wherein a frequency multiplier is included between said generator means and said cathode ray tube for changing the scale of the readings of said tube.

4. In a radio altimeter for aircraft, an ultra high frequency transmitter, a relaxation generator connected to said transmitter for causing said transmitter to operate intermittently, a cathode ray tube having deflecing plates and a grid, a deflecting plate circuit fed from said relaxation generator and serving to cause the beam of said tube to move over the face thereof upon each operation of said transmitter, and a radio receiver for receiving reflected redatiton initially transmitted from said transmitter, and a grid voltage depressing circuit fed from said receiver acting to shut off said beam upon receipt of such reflected rediation, the path produced by said beam on said face being a measure of the height of the aircraft.

5. A radio altimeter as claimed in claim 4, wherein said relaxation generator is provided with variable impedance means connected to said deflecting plate circuit for varying the rate of movement of the tube beam to accordingly vary the readings of said tube.

6. In an instrument for measuring distance, a transmitter, control means for causing said transmitter to regularly and intermittently deliver ultra high frequency pure carrier electromagnetic radiation, a radio receiver, and a cathode ray tube indicator having a grid and deflecting plates, circuit means cooperable with said control means for applying deflecting potentials to said deflecting plates, said cathode ray tube having its grid connected to said receiver to be energized by the output thereof, said cathode ray tube serving to indicate distance to a desired object by measuring the time interval taken by said radiation to reach the desired object and return to said receiver by reflection, such time interval being indicated by the extent of the sweep of the cathode ray beam over the face of the tube during such interval.

7. In an instrument of the character described, a radio transmitter, a radio receiver, control means operating to cause said transmitter to deliver ultra high frequency electromagnetic waves at regularly recurring intervals, and a distance indicator of the cathode ray type having deflecting plates connected for excitation synchronously with the operation of said control means so that the cathode ray of said indicator is initiated in its measuring movement upon each operation of said transmitter, said cathode ray indicator having its control grid connected to said receiver to be controlled by the latter to cause the measuring operation to be determined by the interval required for radiation from said transmitter to reach a desired object and return to said receiver by reflection.

8. In an instrument for measuring distance, a radio transmitter, a radio receiver, control means for causing said transmitter to operate momentarily at regular intervals to deliver pure carrier radiation, a cathode ray tube having deflecting plates and a control grid, said control means comprising a circuit connected to vary the potentials on the deflecting plates of said cathode ray tube for use in controlling the rate of sweep of the cathode ray beam in timing the period required for the electromagnetic radiation from said transmitter to reach a desired object and return by reflection to said receiver, the output of said receiver being connected to said control grid, said receiver operating to determine the end of said timing operation upon the receipt of reflected radiation by changing the voltage of said control grid and causing the cathode ray beam to indicate the end of the timing period and hence provide a measure of the distance to the object.

9. In a radio altimeter for aircraft, an ultra high frequency transmitter of pure carrier radiation, motor driving means, a control circuit for said transmitter having bridging means driven from said motor driving means for causing said transmitter to operate intermittently, a cathode ray tube having deflecting plates and a grid, circuit means controlled from said motor driving means and connected to said deflecting plates for causing the beam of said tube to describe a definite path should the same be turned on, and a radio receiver having its output connected to said tube grid for turning said tube beam on momentarily when direct radiation is received from said transmitter and also when reflected radiation initially transmitted from said transmitter reaches said receiver, thereby producing spots on the face of said tube, the spacing of which is a measure of the height of the aircraft.

10. In a radio altimeter for aircraft, an ultra high frequency transmitter, thermionic tube transmitter control means connected for causing said transmitter to operate intermittently, a cathode ray tube having deflecting plates and a grid, a deflecting plate circuit connected to said control means for applying varying potentials to said deflecting plates to cause the cathode ray to move over the face of said cathode ray tube upon each operation of said transmitter, and a receiver for receiving reflected radiation initially transmitted from said transmitter, the output of said receiver being connected to said grid and acting to shut off said beam upon the receipt of the reflected radiation, the visible path traversed by said beam being a measure of the height of the aircraft.

11. In a radio altimeter for aircraft, an ultra high frequency transmitter, thermionic tube circuit means for causing said transmitter to operate intermittently, a cathode ray tube having deflecting plates and a grid, a deflecting plate circuit connected to said circuit means and including a source of potential normally biasing the tube beam to a point off the face thereof, said thermionic tube circuit means intermittently providing potentials opposing said potential source for causing the beam of said tube to move over the face thereof upon each operation of said transmitter, and a receiver connected to said cathode ray tube grid, said receiver, upon receiving reflected radiation initially transmitted from said transmitter, acting to bias said grid and shut off said beam, the visible path traversed by said beam being a measure of the height of the aircraft.

JOSEPH LYMAN.
FRANCIS L. MOSELEY.
PAUL B. HUNTER.